March 27, 1934.  W. L. GOYETT  1,952,164

PUNCTURE OR LOW PRESSURE SIGNAL FOR PNEUMATIC TIRES

Filed March 6, 1933

Inventor

Warner L. Goyett.

By A. J. O'Brien

Attorney

Patented Mar. 27, 1934

1,952,164

UNITED STATES PATENT OFFICE 1,952,164

PUNCTURE OR LOW PRESSURE SIGNAL FOR PNEUMATIC TIRES

Warner L. Goyett, Canon City, Colo.

Application March 6, 1933, Serial No. 659,719

1 Claim. (Cl. 116—34)

This invention relates to improvements in low pressure alarms for pneumatic tires.

It is well known to people who drive automobiles that whenever a tire develops a slow leak, it is difficult to discover this until the pressure becomes so low that the casing flexes sufficiently to make a difference in the riding of the car and by the time the pressure has decreased to this extent the casing is usually ruined.

In the low pressure tires now almost universally employed the casing will slip on the rim when the pressure decreases below a predetermined amount and whenever this occurs the inner tube will be turned loose from the valve stem and is usually completely ruined.

It is the object of this invention to produce a low pressure signal or alarm that will apprise the driver of the car that the pressure in any one of the tires has decreased below a predetermined limit and thus give him an opportunity to re-inflate the tire before any damage has resulted.

This invention, briefly described, consists of an attachment that can be readily applied to the rim of any automobile wheel of usual construction and which is provided with a plunger having a head at its outer end which engages or is acted upon by the inner tube. A spring is provided for exerting a pressure tending to move the plunger outwardly and the strength of the spring is so proportioned that when the pressure in the inner tube decreases below a predetermined value, the plunger will move and release a mechanism that will cause a signal or alarm to become operative.

Having thus briefly set out the objects of this invention and described the same in general terms, the invention will now be described in detail, and for this purpose reference will be had to the accompanying drawing in which the preferred embodiment of the invention has been illustrated, and in which.

Figure 1:
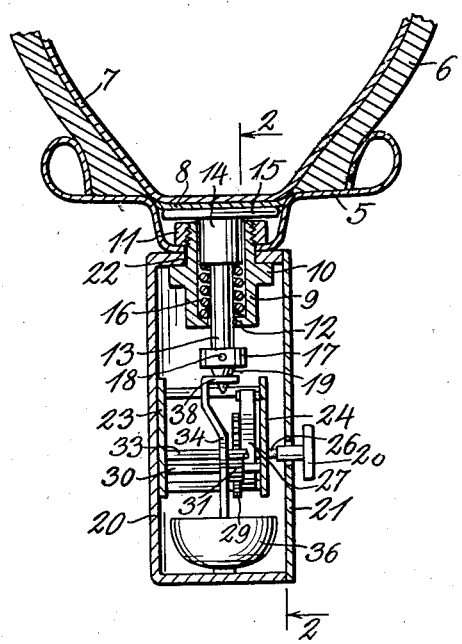
Fig. 1 is a vertical section through a portion of an automobile wheel rim and through the signal mechanism which forms the subject of this invention.
Figure 3:
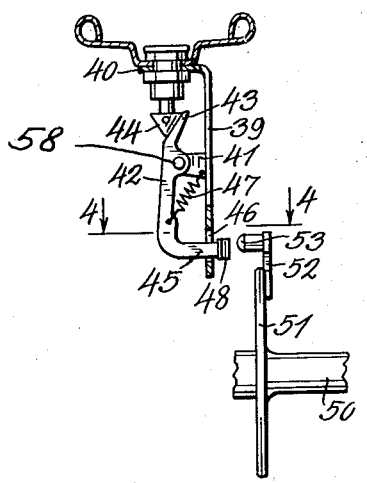
Fig. 3 is a diagrammatic view showing a slightly modified form of the invention.

In the drawing reference numeral 5 designates a rim of the type employed on automobile wheels and reference numeral 6 indicates the tire casing, while reference numeral 7 designates the inner tube. The inner tube is usually spaced from the inside of the rim by means of a liner which has been designated by reference numeral 8.

Figure 2:
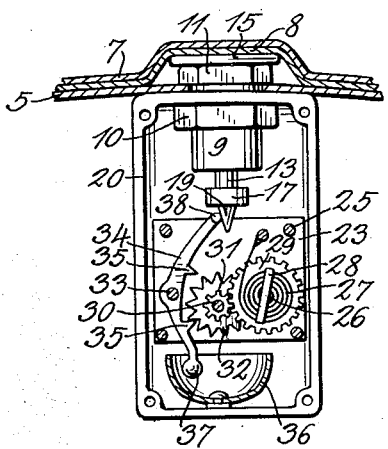
Fig. 2 is a section taken on line 2—2, Fig. 1.
Figure 4:
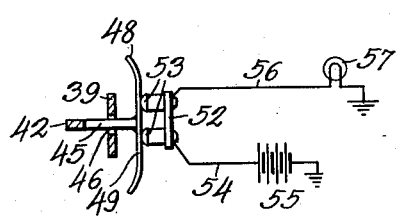
Fig. 4 is a section taken on line 4—4, Fig. 3, and shows the parts in operative position.

The invention that forms the subject of this application consists of a tubular plug 9 of substantially cylindrical shape which is provided on its outside with a flange 10, whose outer surface is made in the form of a hexagon as indicated in Fig. 2. The outer end of the plug has a threaded portion to which the nut 11 is operatively connected. The inner end of the plug has an inwardly extending flange 12 which is provided with a central opening through which the cylindrical part 13 of the plunger 14 extends. The outer end of the plunger has a head 15 on which the liner 8 rests. The part indicated by reference numeral 14 is larger in diameter than that designated by reference numeral 13 and a shoulder is therefore formed at the junction of those two parts. A spring 16 is interposed between the shoulder on the plunger and the flange 12, and this spring is selected of such strength that it will move the plunger outwardly against the pressure in the inner tube whenever this pressure is reduced below a predetermined value. A collar 17 is secured to the lower end of member 13 and held in place by a pin 18 or some similar means. The extreme lower end of member 13 is conical in shape as indicated by reference numeral 19.

When a device constructed as above described, is applied to an automobile rim, the plunger will be pressed against the inner tube by the action of the spring and when the pressure is above a predetermined value, this will overcome the action of the spring and hold the parts in the position shown in Fig. 1. When the pressure decreases below a predetermined value, the spring will function to move the plunger outwardly and thus move the conical end 19 towards the flange 12.

The device just described can be employed in various ways for operating a signal or an alarm whenever the air pressure decreases below a predetermined value, and in Figs. 1 and 2, one form of such an alarm has been illustrated. A substantially rectangular casing 20 having a removable cover 21 is provided at one end with an opening 22 through which the plug extends as shown in Fig. 1, and whenever nut 11 is tightened, the casing will be held in place between the flange 10 and the surface of the rim. Located within the casing is an escapement mechanism comprising two plates 23 and 24. These plates are held in spaced relation by means of spacing members 25 and journaled in the two plates is a spindle 26 that carries a spring 27 which can be wound by a suitable key 28. The spindle 26 also carries a gear wheel 29 which is connected to it by the usual pawl and ratchet mechanism which has not been shown because it is old and well known.

Mounted for rotation parallel to spindle 26 is another spindle 30 that carries a pinion 31 and an escapement wheel 32. The pinion 31 is in mesh with gear 29 as shown in Fig. 2. Pivoted at 33 is an escapement lever arm 34 having two escapement teeth 35. Whenever wheel 32 rotates it will rock the escapement lever about its pivot in the manner well known in connection with clocks of different kinds. Located below the escapement is a bell 36 and the escapement lever is provided at one end with a clapper 37 which strikes against the bell whenever the escapement lever is rocked through the action of the wheel 32. The upper end of the escapement lever has been bent at right angles to form a part 38 that will engage the conical part 19 when the latter is in its outermost position. Whenever the parts are in the position shown in Fig. 2, the escapement is held inoperative but when the pressure in the inner tube decreases below a predetermined value, plunger 13 will move outwardly, thereby withdrawing the conical part 19 from the path of part 38 and the escapement will then operate and ring the bell. When a mechanism like that shown in Figs. 1 and 2 is employed, the plug and associated parts should be located diametrically opposite from the valve stem and a counterweight applied to the wheel at the valve stem to compensate for the weight of the parts.

Where a signal is desired on the instrument board or located within the car in closed proximity to the driver, it is necessary to make some slight modifications so as to employ an electric circuit for operating either an electric light or a buzzer or other audible signal. When an electrically operated signal or alarm is to be employed, the casing 20 is replaced by a bracket 39, one end of which is bent at right angles as indicated at 40 and has an opening through which the tubular plug passes. This bracket is held in place in substantially the same way as the casing 20. The bracket is provided on one side with one or more lugs 41 to which or between which is pivoted a lever 42. The upper end of this lever has an inclined portion 43 which is engaged by the conical end 44 of the plunger 13. The lower end 45 is bent outwardly and extends through an opening 46 in the bracket. A spring 47 is connected with the lever and with the bracket and tends to move it in such a direction that end 45 will extend farther through the opening. Secured to the end 45 is a contact spring 48 which is preferably provided with a straight central portion 49. Numeral 50 designates the axle and 51 a stationary member secured to the axle which may be part of the brake mechanism. Attached to member 51 is a piece of insulating material 52 to which two spaced electrically conducting contact members 53 are attached. Secured to one of the contact members is a conductor 54 that extends to the ungrounded pole of the ignition battery 55 and a conductor 56 extends from the other contact member to a lamp or buzzer 57, which is located in such a place that it can be seen or heard, as the case may be, by the driver. Whenever the pressure decreases within the tire to such an extent that the plunger 13 moves outwardly, lever 42 is rotated in a counterclockwise direction about its pivot 58 and every time the wheel makes a revolution, the contact spring 48 will electrically connect the two contacts 53, thereby closing the electric circuit and causing the lamp 57 to flash, or if a buzzer is used, causing the buzzer to sound.

From the above description it will be apparent that the device just described can readily be applied to any automobile wheel having a metal rim and can be used to operate either a mechanism alarm carried by the wheel or some alarm carried by the body of the car.

Having described the invention what is claimed as new is:

In a device of the class described, in combination, a rim, a pneumatic tire casing carried by the rim, an inner tube in the casing, the rim having an opening, a tubular plug having one end extending through the opening, means for limiting the outward movement of the plug, a nut threadedly connected with the outer end of the plug for securing it to the rim, the inner end of the plug having an inwardly projecting shoulder to serve as an abutment, a coil spring located in the tubular member and having one end resting on the shoulder, a plunger having a portion extending through the tubular plug and through the coil spring, the plunger having a shoulder for engaging the other end of the spring, the outer end of the plunger being forced against the inner tube by the action of the spring, whereby the plunger will be moved outwardly when the pressure in the inner tube falls below a predetermined value, a support secured to the rim by the tubular plug, a lever pivotally connected to the support at a point intermediate its ends, the inner end of the plunger being tapered, one end of the lever overlapping the tapered end of the plunger, a spring operatively associated with the lever and functioning as a means for normally holding one end of the lever in contact with the tapered surface of the plunger, whereby the lever will turn about its pivot when the plunger moves in the direction of its length, and means controlled by the free end of the lever for making a signal operative when the plunger has moved a predetermined distance in response to the action of the first mentioned spring.

WARNER L. GOYETT.